June 3, 1930.  N. T. BRADFORD ET AL  1,761,702
PUMP
Filed Dec. 27, 1928

INVENTORS
Nathan T. Bradford
Robert C. Early
John A. Ransmith
ATTORNEY

Patented June 3, 1930

1,761,702

UNITED STATES PATENT OFFICE

NATHAN T. BRADFORD, OF TERRA BELLA, AND ROBERT E. EARLY, OF SAN JOSE, CALIFORNIA

PUMP

Application filed December 27, 1928. Serial No. 328,785.

This invention relates particularly to that type of pumps known as centrifugal pumps for both deep and shallow wells.

In the construction of centrifugal pumps of the character indicated it is difficult to prevent access of water and the erosive materials carried thereby to the oil lubricating system of the drive shaft.

It is one object of the present invention to provide a positive means for preventing the access of water to the oil lubricating system of the pump shaft, and to prevent undue leakage of oil at the upper end of the shaft.

It is also an object of the invention to provide a simple and efficient means that functions as a support for the main pump head, but also functions as a support for the discharge casing and the drive shaft bearings, and the means for preventing access of water to the oil line above referred to, and that may also be utilized to function as an impeller bowl.

It is still another object of the invention to increase the efficiency of the pump by mounting an impeller on the drive shaft at the delivery end of the discharge column.

Finally it is an object of the invention to provide a pump structure of the character indicated that will be simple in form, economical to manufacture, of few parts, easily assembled, and highly efficient in its practical application.

Figures 1, 2:
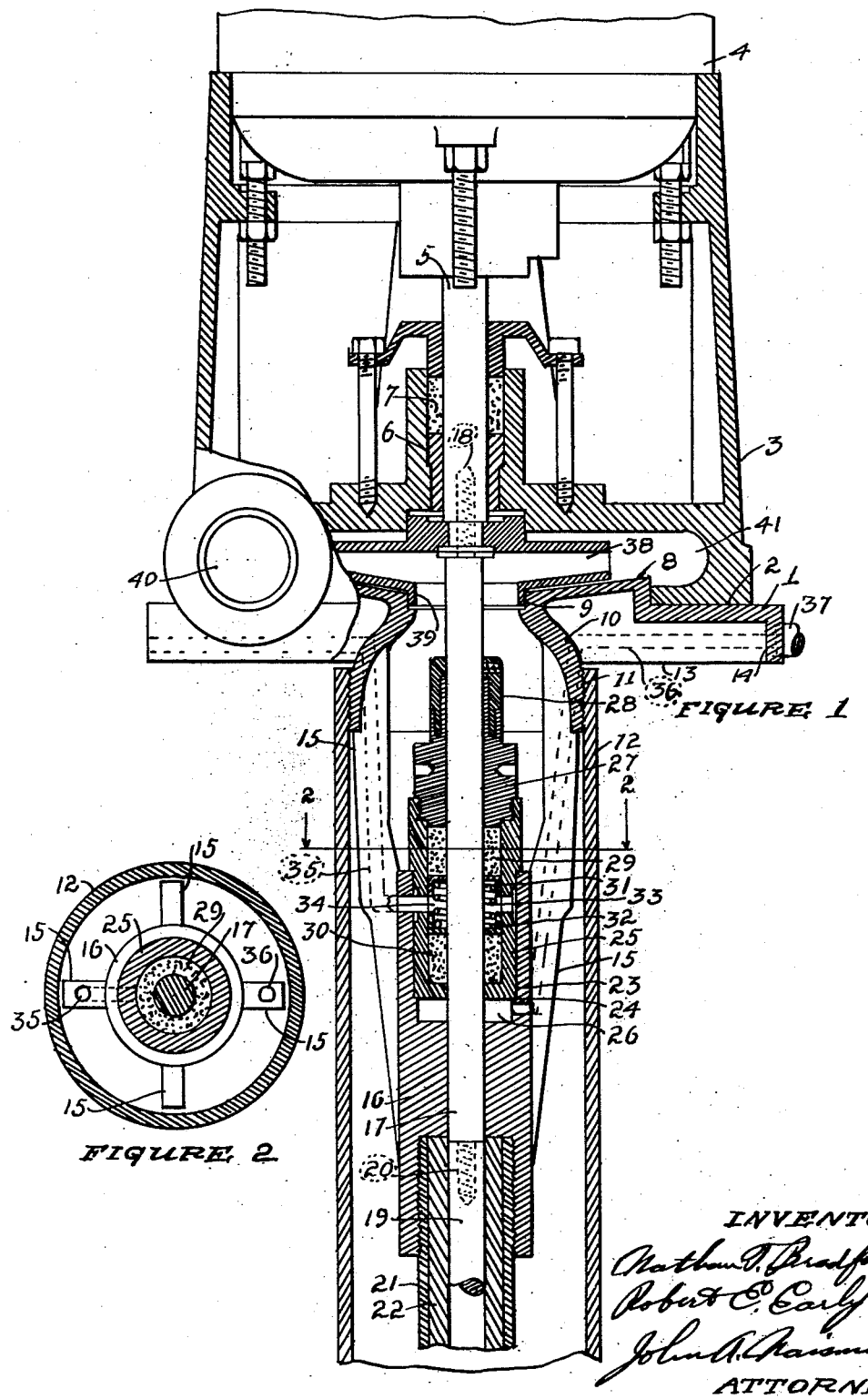
Figure 1 is a longitudinal section through a pump structure embodying our invention, partly in elevation.
Figure 2 is a sectional view on 2—2 of Figure 1.

Referring more particularly to the drawing, we show at 1 an annular base member adapted to be mounted on a suitable foundation in concentric relation to the axis of the pump shaft and provided with a seat at 2 upon which is positioned the pump head 3 supporting a motor 4, the motor shaft being vertically arranged at 5, and passing through a suitable bushing 6 and packing 7. Interiorly of the seat 2 on member 1 is formed a dished surface 8 and an annular neck portion 9. Depending from the inner portion of the part 1 is an inverted bowl shaped part 10 exteriorly threaded as at 11 to receive the threaded end of discharge casing 12. Webs as 13 are formed between part 10 and the outer depending flange 14 of part 1. The parts 1, 10 and 13 and 14 are preferably formed as an integral whole as shown.

Formed integrally with the part 10 and depending therefrom are a plurality of converging arms as 15 supporting a cylindrical element 16 through which passes a stub shaft 17 screwed into the motor shaft at 18 and the drive shaft 19 at 20.

Into the lower end of element 16 is screwed a shaft enclosing tube 21, and filling the space between the tube 21 and shaft 19 is a wood bearing member 22.

An annular recess 23 is formed in the upper end of element 16, and this is provided with a seat at 24. Inserted within the recess 23 is a stuffing box 25 seated upon the shoulder 24 to form a chamber 26 and having a packing nut threaded into its upper end as at 27. The upper end of the nut 27 is fitted with a sealing nut 28. In the upper and lower ends of the chamber in the stuffing box are placed packings as 29 and 30, and bearing against the packings are annular flanged rings as 31 and 32. Bearing against the opposed rings 31—32 is a spring 33.

Communicating with the chamber 34 in which the spring 33 is positioned is a conduit 35, the said conduit passing through one of the webs or arms 15, the part 10 and one of the webs 13 to the exterior of the part 1. Another conduit is shown at 36 communicating with the chamber 26 and passing through one of the arms 15 and part 10 and one of the webs 13 to the exterior of the part 1 to receive lubircating oil from a supply pipe 37.

At 38 is shown an impeller mounted on the stub shaft 17 and overlying the dished surface 8 on the part 1 and with a neck portion 39 rotating within the neck portion 9 of the part 1.

When the pump is constructed and assembled as described the water raised by the lower impellers, not shown, passes upwardly around the assembly supported by arms 15 to the impeller 38 which increases its pressure before it is discharged at 40, the outlet 40 communicating with the chamber 41, in head 3. The lubricating oil introduced into chamber 26 makes its way downwardly around the shaft 17—19 to lubricate it throughout its length.

By means of the packing structure described at 23—35 the oil lubricating line is completely separated from the water passing through the pump, because if any water makes its way into the chamber 34 it naturally follows the line of least resistance and discharges through the conduit 35. Likewise if any oil is permitted to reach the chamber 34 it also is discharged through conduit 35.

It may be readily seen from the foregoing disclosure that we have provided a pump structure wherein the oil lubricating system may function at its maximum efficiency, wherein the booster impeller is arranged to give the best results, and wherein the structural details are of the simplest and permit the pump to be manufactured and assembled at low cost, and require but little expense for maintenance.

It is to be understood, of course, that while we have herein shown and described but one specific embodiment of the invention, changes in form, construction, and method of assembly and operation may be made within the scope of the appended claims.

We claim:

1. A base member adapted to be mounted at the top of a well and adapted to support a pump head, a pump head mounted thereon to form a pressure chamber therewith, an impeller disposed within said chamber, a depending bowl formed integrally with the base member and threaded to engage a discharge casing, and a bearing member formed integrally with and depending from the bowl.

2. In a pump, a base member adapted to be mounted at the top of a well, a pump head mounted thereon and forming a pressure chamber therewith, a neck portion formed in said base member, an impeller operatively mounted in said chamber and neck portion, an inverted bowl-shaped portion depending from said member and threaded to engage a discharge casing, a plurality of converging and depending arms mounted on said bowl shaped portion, and a bearing member supported by said arms.

3. In a pump, a base member adapted to be mounted at the top of a well, and supporting a depending and centrally positioned inverted bowl shaped portion, a plurality of depending and converging arms supported by the bowl, a bearing member supported by the arms, a shaft revolubly mounted in the bearing member, a stuffing box mounted in the bearing member to form an oil chamber therewith, a conduit extending from the exterior of the base member through the bowl, arm and bearing member to said oil chamber, the said stuffing box having a chamber formed therein, packing positioned in the opposing ends of the chamber, resilient means inserted between the packings and bearing thereagainst, and a conduit extending from the stuffing box chamber through the bearing member, one of said arms, the bowl and base member to the exterior of the well.

NATHAN T. BRADFORD.
ROBERT E. EARLY.